(12) United States Patent
Nakajima et al.

(10) Patent No.: US 7,018,736 B2
(45) Date of Patent: Mar. 28, 2006

(54) APPARATUS AND METHOD FOR PREVENTING LOSS OF ELECTRICAL POWER IN A PORTABLE ELECTRONIC DEVICE

(75) Inventors: Yoshiyuki Nakajima, Sagamihara (JP); Yusuke Kan, Yokohama (JP)

(73) Assignee: Matsushita Electric Works, Ltd., Osaka (JP)

( * ) Notice: Subject to any disclaimer, the term of this patent is extended or adjusted under 35 U.S.C. 154(b) by 367 days.

(21) Appl. No.: 10/422,935

(22) Filed: Apr. 25, 2003

(65) Prior Publication Data

US 2004/0018420 A1    Jan. 29, 2004

(30) Foreign Application Priority Data

Jul. 24, 2002   (JP) .............................. 2002-215641

(51) Int. Cl.
*H01M 2/10* (2006.01)
(52) U.S. Cl. ..................... 429/96; 429/99; 429/100
(58) Field of Classification Search .................. 429/96, 429/97, 99, 100
See application file for complete search history.

(56) References Cited

U.S. PATENT DOCUMENTS

| | | | |
|---|---|---|---|
| 4,083,011 A | | 4/1978 | Ferrell et al. ............... 325/352 |
| 5,071,716 A | * | 12/1991 | Petzl et al. ..................... 429/9 |
| 5,537,022 A | * | 7/1996 | Huang ....................... 429/99 X |
| 6,064,577 A | * | 5/2000 | Moskowitz et al. .... 429/100 X |
| 6,141,223 A | * | 10/2000 | Fukushima ............... 429/97 X |
| 6,465,123 B1 | * | 10/2002 | Baumann et al. ............. 429/99 |
| 6,743,545 B1 | * | 6/2004 | Huang .......................... 429/96 |
| 2003/0068547 A1 | * | 4/2003 | Wu .............................. 429/99 |

FOREIGN PATENT DOCUMENTS

JP       2000-067834    *  3/2000

* cited by examiner

*Primary Examiner*—Stephen J. Kalafut
(74) *Attorney, Agent, or Firm*—Greenblum & Bernstein, P.L.C.

(57) ABSTRACT

An apparatus and method for preventing an interruption of electrical power to a portable electronic device, such as, for example, a call device, supplied by an internal battery when the portable electronic device is dropped or subjected to an external shock. A battery cover seals a battery compartment in which a negative battery terminal and a positive battery terminal, of a battery, are in contact with a respective compressible contact terminal and a fixed terminal. A battery fixing base plate, attached to an inner surface of the battery cover, includes a set flange that is inserted between a battery compartment wall to which one contact terminal is attached and an associated battery terminal in contact with the one contact terminal, thus providing a mechanism that prevents a longitudinal movement of the battery in the battery compartment.

9 Claims, 5 Drawing Sheets

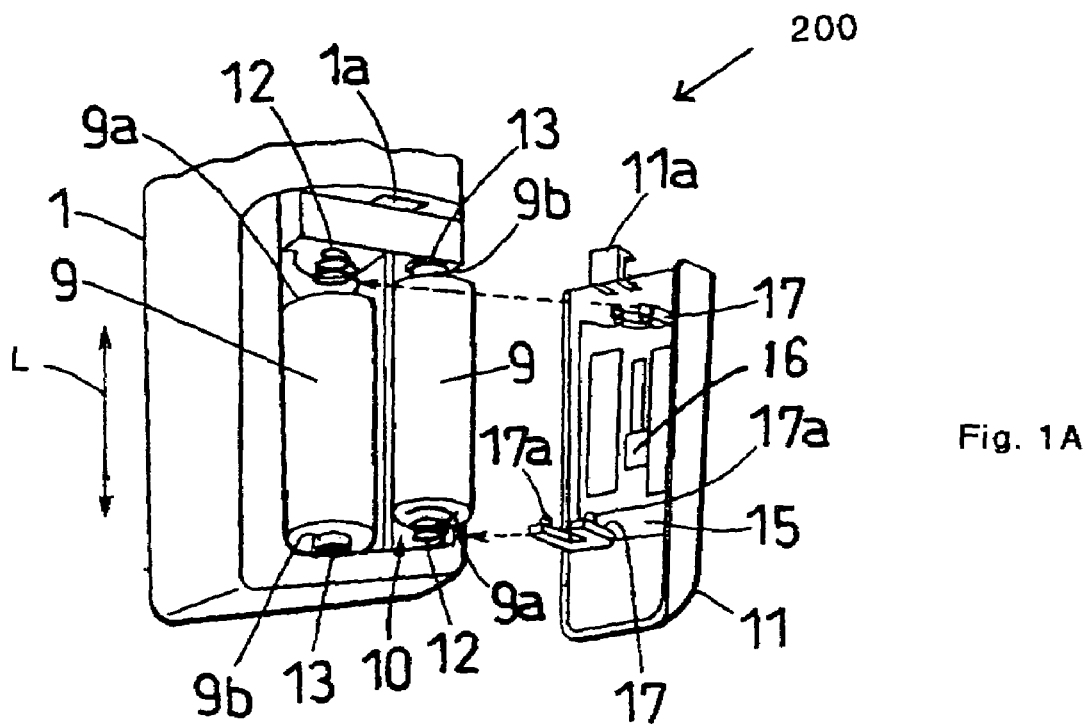
Fig. 1A
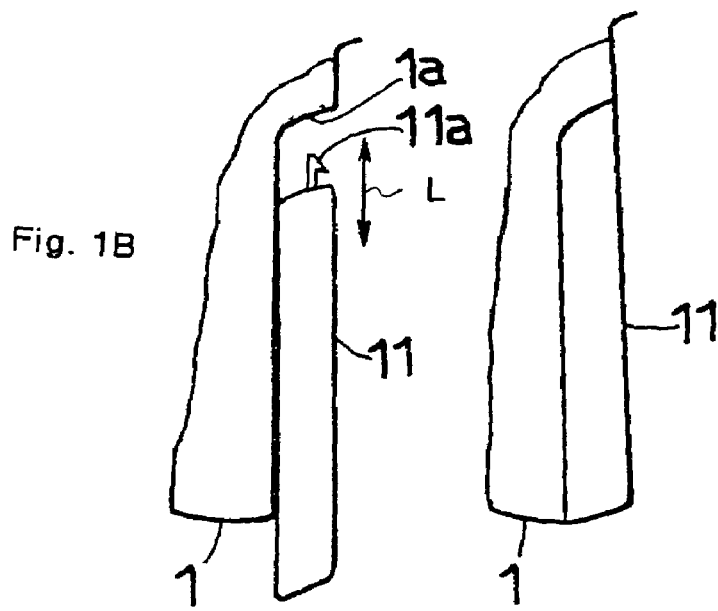
Fig. 1B
Fig. 1C

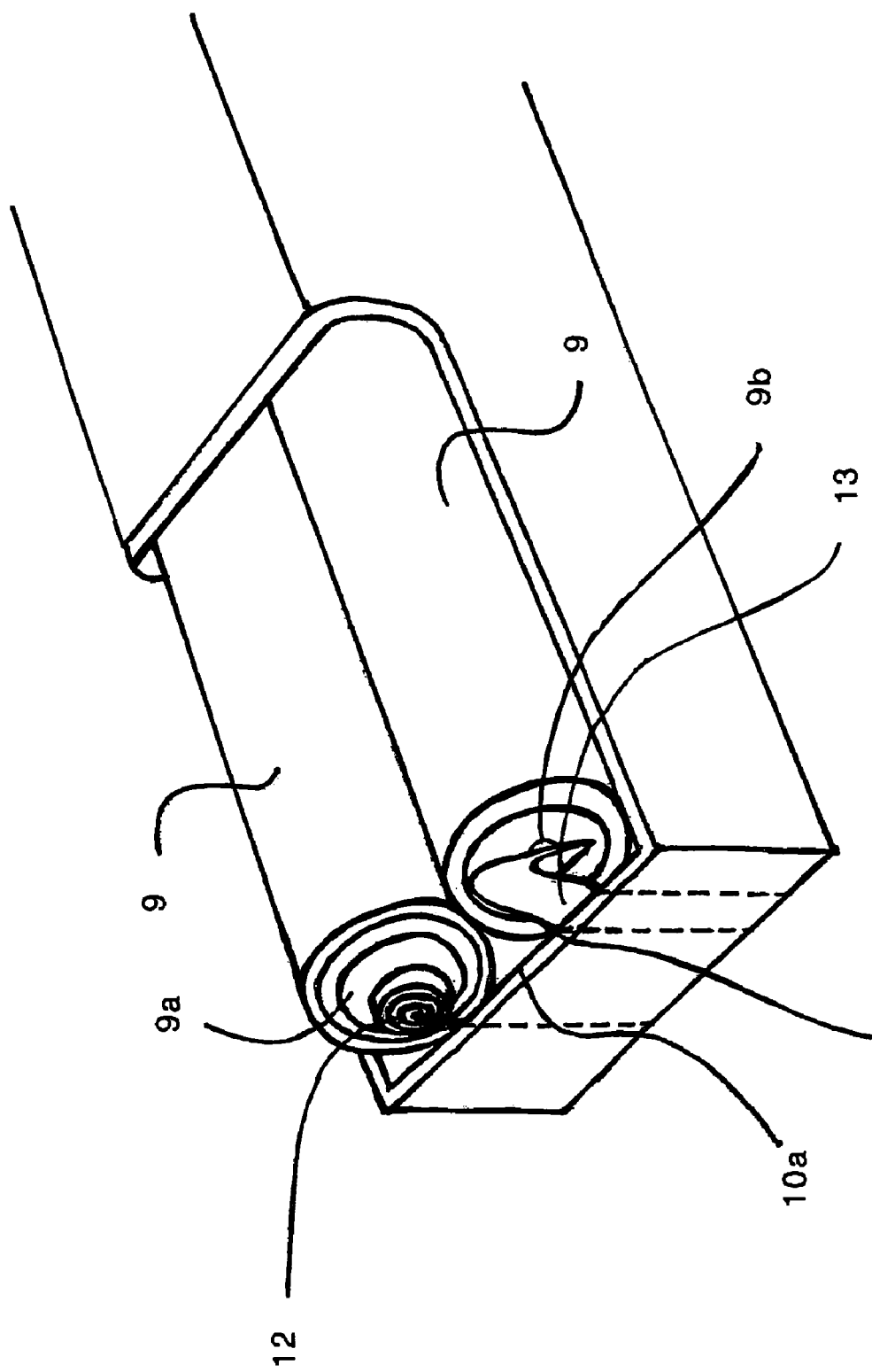

APPARATUS AND METHOD FOR PREVENTING LOSS OF ELECTRICAL POWER IN A PORTABLE ELECTRONIC DEVICE

BACKGROUND OF THE INVENTION

1. Field of the Invention

The present invention is directed to an apparatus for preventing a loss of electrical power to a portable electronic device, such as, for example, a call device used for emergency communications, when the portable electronic device is subjected to an external shock or impact.

2. Discussion of Background and Other Information

A conventional portable electronic device, such as, for example, a call device 100 is illustrated in FIGS. 5A to 5C. FIG. 5A depicts an external front view of the portable call device 100. FIG. 5B depicts an external rear view of the portable call device 100. FIG. 5C depicts an external rear view of the portable call device 100 showing the contents of a battery compartment 10 when a battery compartment cover 11 (shown in FIG. 5B) is removed.

All components required for operation of the portable call device are installed within a call device case 1, hereafter referred to as "case 1." As shown in FIG. 5A, a front surface of the case I includes a plurality of speaker apertures 2, a display device 3, a microphone aperture 4, a front cover 6, an emergency CALL button 7, and a TEST button 8. Further, radio antenna 5 is located proximate a top surface of the front cover of the call device 100 that enables the transmission and reception of radio waves.

The speaker apertures 2 permit a passage of sound emitted from a speaker (not shown) housed inside the call device 100. The display device 3 of the conventional portable call device 100 comprises a plurality of light emitting diodes 4 that function to provide an indication of various operating conditions. Microphone aperture 4 permits sound, produced by, for example, a user of the call device 100, to be transmitted to a microphone (not shown) housed inside of the call device 100.

The front cover 6 of the conventional call device 100 pivots outward to expose the emergency CALL button 7, and the TEST button 8. The CALL button 7 is manipulated by the user of the call device 100 to obtain assistance. The TEST button is manipulated by the user to perform a self test of the call device 100, to confirm that the call device 100 is connected to a wireless communications network.

As illustrated in FIG. 5B, battery compartment 10, which houses a power source, such as, for example, one or more batteries 9 (see FIG. 5C), is provided within a rear surface of the case 1. The battery compartment 10 extends inward from the rear surface thereof, and is selectively covered by a removable battery cover 11. Batteries 9 are typically readily available commercially marketed type batteries, although specialized power sources are sometimes used.

As shown in FIG. 5C, a compressible contact terminal 12 and a fixed contact terminal 13 are provided within the battery compartment 10 at opposite ends thereof in a battery lengthwise direction L, to make electrical contact with negative battery terminals 9a and positive battery terminals 9b, respectively, of the battery 9. In the conventional call device 100 of FIGS. 5A to 5C, the battery compartment 10 accommodates two batteries 9 that are arranged adjacently, with their common terminals facing opposite directions, so that the batteries 9 are electrically connected in series.

As a result, the negative battery-terminal 9a maintains physical contact with the compressible contact terminal 12, while the positive battery terminal 9b maintains physical contact with the fixed contact terminal 13. The compressible contact terminal 12 is typically formed from a coiled wire. The batteries 9 provide electrical power for the operation of the conventional call device 100.

The aforesaid conventional call device 100 is constructed so as to locate the compressible contact terminals 12 and the fixed contact terminals 13, which maintain contact with the negative battery terminals 9a and positive battery terminals 9b, respectively, in mutual opposition against internal sidewalls of the battery compartment 10. The compressible contact terminal 12, as a result of being formed as a compressible coil, maintains contact with the negative (minus) terminal 9a of battery 9, and by applying pressure against the negative battery terminal 9a of the battery 9, has the effect of pressing the positive battery terminal 9b of the battery 9 against the fixed contact terminal 13.

In the event that the above-described conventional call device is accidentally dropped by the user, the shock of impact can result in the batteries 9 moving in their lengthwise (L) direction as a result of the temporary compression of at least one of the compressible contact terminals 12, resulting in the positive battery terminal 9b of at least one battery 9 to momentarily separate from the fixed contact terminal 13, resulting in the interruption of electrical power to the call device 100. The momentary interruption (loss) of electrical power to the call device 100 has the effect of preventing the call device 100 from performing a radio communication. In addition, when electrical power is re-applied to the call device 100, a microcomputer associated with the call device 100 must perform an initialization procedure, resulting in a delay before the call device 100 can be operated by the user.

The call device 100 is generally used by elderly and/or infirm and/or physically handicapped individuals, which are subject to debilitating illnesses, such as, for example, a heart attack or other ailment. Even healthy individuals use the call device 100 to obtain assistance when, for example, their automobile breaks down, or they are attacked. Thus, it is important that the call device 100 operate properly at all times, so that such individual came timely call for emergency aid by communicating with an emergency aid center or other such facility. As a result, the call device 100 plays an important part in protecting the safety and lives of such individuals. Due to the small size of the call device 100, it is prone to being dropped. In fact, it is anticipated that an aged or weakened individual will drop the call device 100 at the exact moment that they wish to use it.

SUMMARY OF THE INVENTION

In view of the above, an object of the present invention is to devise a portable electronic device, such as, for example, a call device, in which the battery is continuously maintained in contact with its associated contact terminals, so that there is no momentary interruption of electrical power when the call device is dropped or subjected to a sudden shock.

According to a feature of the present invention, a case of a call device is formed to have a battery compartment and a removable battery cover. A compressible contact terminal and a fixed contact terminal located in the battery compartment engage with corresponding terminals located at opposing ends of a battery installed within the battery compartment. A battery fixing base plate is attached to the inner surface of the battery cover which incorporates a battery set flange formed therein. When the battery cover is attached to the case, the battery set flange enters a region between an internal sidewall of the battery compartment (to which the compressible contact terminal is attached) and the battery terminal in contact with the compressible contact terminal, in order to prevent a movement of the battery in the lengthwise direction.

According to an advantage of the present invention, the battery fixing base plate is attached to the battery cover via a sliding joint that allows the battery fixing base plate to slide in a longitudinal direction.

According to another feature of the present invention, two batteries are selectively insertable (accommodated) within the battery compartment, with common terminals of the two batteries facing opposite directions. Two battery fixing base plates are provided, each being located mutually adjacent and in parallel to the other, and each having a battery set flange formed thereon. Each battery set flange is insertable, at a location mutually opposite to the other set flange, in a region between an internal sidewall of the battery compartment to which a compressible contact terminal is attached, and the battery terminal in contact with the compressible contact terminal.

According to another advantage of the present invention, the portable call device is constructed with a battery fixing base plate structured to accommodate two batteries, with the fixing base plate being joined to a battery cover through a sliding joint. The battery fixing base plate may be a single battery fixing base plate, or a plurality of battery fixing base plates. In which case the number of battery fixing base plates corresponds to the number of batteries installed in the battery compartment, with each battery fixing base plate including an associated set flange.

According to a further advantage of the invention, the portable call device includes a cushioning part, attachable to an inner surface of the battery fixing base plate, that comes into contact with a side of the battery installed in the battery compartment.

According to an object of the present invention, an apparatus is designed to prevent a loss of electrical power in a battery operated electronic device when the battery operated electronic device is subjected to an impact. The apparatus includes a battery fixing base plate, and two set flanges that are formed on the battery fixing base plate. The two set flanges extend outward from the battery fixing base plate and are symmetrically arranged on the battery fixing base plate. Each set flange enters a region between an internal sidewall of the battery compartment, to which an associated compressible contact terminal is attached, and a battery terminal of an associated battery in contact with the compressible contact terminal.

According to a feature of the invention, the battery fixing base plate is secured to a battery cover, and two set flanges formed on the battery fixing base plate enter the region between the internal sidewall of the battery compartment and the battery terminal of the associated battery when the battery cover is attached to the case. The two battery set flanges prevent a movement of their associated battery in a longitudinal direction.

According to another feature of the invention, an aperture is formed in the battery fixing base plate. A guide post formed on the battery cover extends into the battery compartment. The guide post is inserted through the aperture formed in the battery fixing base plate and secured to the battery cover by an attaching button. Further, the aperture may be a slot formed at an approximate center of the battery fixing base plate. In addition, a stop tab that extends outward from an inner surface of the battery cover may be provided to restrict a sliding movement of the battery fixing base plate relative to the battery cover.

An advantage of the invention is that the battery fixing base plate may be actually be a first battery fixing base plate and a second battery fixing base plate. A first set flange is associated with the first battery fixing base plate, and a second set flange is associated with the second battery fixing base plate.

In another feature of the invention, a cushioning pad may be attached to an inner surface of the battery fixing base plate to provide a resilient support surface for a side of the associated battery. The cushioning pad may be formed from a sponge-like material and attached to the inner surface of the battery fixing base plate with an adhesive.

According to an object of the present invention, an apparatus prevents a loss of electrical power in a battery operated electronic device when the battery operated electronic device is subjected to an impact. The apparatus includes means for removing slack from a region between an internal sidewall of the battery compartment, to which one of a compressible contact terminal and a fixed contact terminal is attached, and an associated battery terminal of the battery in contact with the one of the compressible contact terminal and the fixed contact terminal, means for securing the slack removing means to a battery fixing base plate, and means for slidably affixing the battery fixing base plate to a battery cover.

In accordance with a feature of the invention, two set flanges are asymmetrically arranged on the battery fixing base plate, with each set flange entering a region associated one of two batteries.

According to another object of the invention, a method is disclosed for preventing a loss of electrical power in a battery operated electronic device when the battery operated electronic device is subjected to an impact. A set flange is inserted into a region between an internal sidewall of a battery compartment, to which one of a compressible contact terminal and a fixed contact terminal is attached, and a respective battery terminal of a battery in contact with the one of the compressible contact terminal and the fixed contact terminal. The set flange is maintained in the region as the battery cover seals the battery compartment.

According to a feature of the invention, a guide post is provided on an inner surface of the battery cover that extends into the battery compartment when the battery cover seals the battery compartment. A battery fixing base plate is provided that includes a slot formed at an approximate center of the battery fixing base plate. The battery fixing base plate is placed proximate an inner surface of the battery cover by passing the guide post provided on the battery cover through the slot in the battery fixing base plate, and secured with a securing button to prevent a separation of the battery fixing base plate from the battery cover.

According to an advantage of the invention, two batteries may be received in the battery compartment, with their common terminals facing opposite directions, such that a negative terminal of a first battery makes electrical contact with a positive terminal of a second battery. Two set flanges are then provided, with each set flange extending outward from the battery fixing base plate to be inserted in a respective region associated with each battery. In addition, the two set flanges may be symmetrically arranged on the battery fixing base plate.

According to another advantage of the invention, the set flange may be inserted into the region between an internal sidewall of the battery compartment to which the compressible contact terminal is attached, and a negative battery terminal of the battery in contact with the compressible contact terminal.

According to another advantage of the invention, the set flange may be manufactured from a conductive material, with the conductive set flange being inserted into the region between an internal sidewall of the battery compartment to which the fixed contact terminal is attached, and a positive battery terminal of the battery in contact with the fixed contact terminal.

BRIEF DESCRIPTION OF THE DRAWINGS

The foregoing and other objects, features, and advantages of the invention will be apparent from the following more particular description of a preferred embodiment, as illustrated in the accompanying drawings which are presented as a non-limiting example, in which reference characters refer to the same parts throughout the various views, and wherein:

FIG. 1A illustrates a battery compartment formed in a rear surface of a case of a portable call device of the present invention;

FIG. 1B illustrates a removable battery cover slidable in a predetermined direction to selectively secure one or more batteries installed in the battery compartment of the portable call device of FIG. 1A;

FIG. 1C illustrates the removable battery cover attached to the rear surface of the case of the portable call device of FIG. 1A;

FIG. 1D illustrates a variation of the battery compartment shown in the portable call device of FIG. 1A, in which a rear side wall is partially open;

DETAILED DESCRIPTION OF A PREFERRED EMBODIMENT

Figure 2:
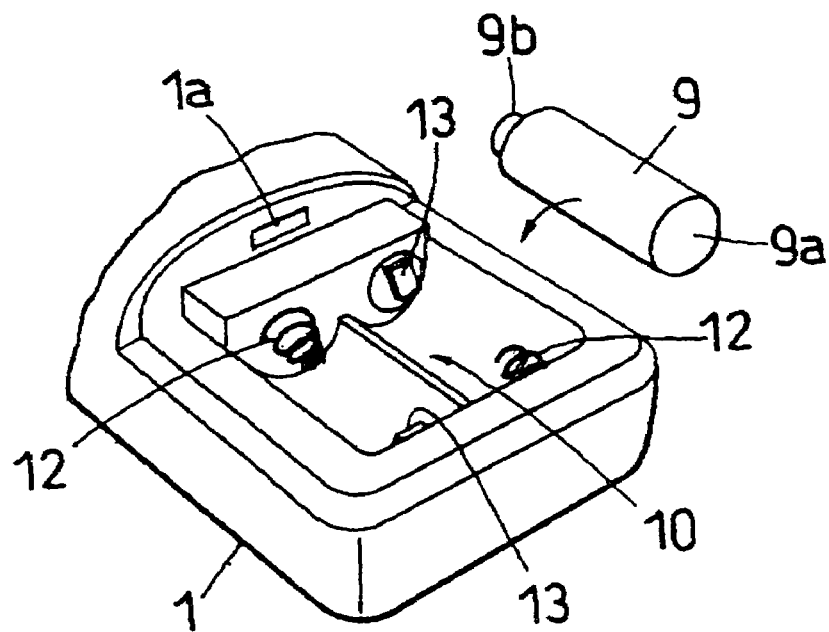
FIG. 2 illustrates in greater detail the battery compartment of the portable call device of FIG. 1A.

While the present invention will be described with respect to a portable call device, it is envisioned that the present invention is useable with any electronic device that employs one or more battery. Thus, the present invention is not to be construed as being limited to use only with a portable call device.

A portable electronic device, such as, for example, a call device 200, incorporates a radio transmission circuitry for making emergency contact with a communications facility. The construction of the radio transmission circuitry incorporated in the call device 200 of the present invention is comparable to that incorporated in the conventional portable call device 100, and thus, a discussion thereof is omitted herefrom. However, it is noted that, like the conventional portable call device 100, the call device 200 of the present invention is equipped with a radio antenna 5, speaker sound apertures 2, a display device formed by a plurality of light emitting diodes 3, a microphone sound aperture 4, a radio antenna 5, and a pivotable front cover 6 that protects an emergency CALL button 7 and a TEST button 8. However, it is understood that variations thereof may be made without departing from the scope and/or spirit of the present invention.

As shown in FIGS. 1A and 2, battery compartment 10 extends inward from a rear surface of case 1, and houses two batteries 9, such as, but not limited to, for example, two commercially available dry cell AA alkaline batteries, that provide electrical power for the call device 200. That is, a compartment is formed in the rear surface of the case 1 that is designed to receive a removable battery cover 11. When the battery cover 11 is removed, the battery compartment 10, which houses one or more batteries 9, is revealed or exposed. In this regard, it should be appreciated that the call device 200 of the present invention can be implemented using one battery, or more than one battery, and the present invention is equally application to these situations. Further, the battery 9 used to supply electrical power to the call device 200 may be a special purpose (e.g., custom designed) battery without departing from the scope and/or spirit of the invention. The battery compartment 10 is selectively covered and exposed via the selective attachment of the battery cover 11.

While the battery compartment 10 of the call device 200 is described with respect to the configuration shown in FIG. 1A, the present invention may be used with battery compartments having alternative configurations. For example, FIG. 1D illustrates an alternative battery compartment arrangement having a partially open side wall 10a, in which a compressible contact terminal 12 and a fixed contact terminal 13 protrude from the battery compartment 10 to make contact with respective terminals 9a and 9b of the batteries 9. It is understood that the present invention is applicable to numerous battery compartment shapes, also referred to as battery compartment configurations, without departing from the spirit and/or scope of the invention.

As shown in FIGS. 1B and 1C, the battery cover 11 slides along the battery compartment in a lengthwise direction L. Latch 11a of the battery cover 11 joins to latch, or engage with, stop 1a formed in the case 1 adjacent to the battery compartment 10.

As noted above, the present invention is described with respect to a call device 200 that utilizes two batteries 9, but that it is understood that the present invention is applicable to a call device that uses a single battery, or plural batteries, which may be either general purpose, commercially available type batteries, or custom batteries specific to the call device. As shown in FIGS. 1A and 2, the batteries 9 are adjacently disposed within the battery compartment 10 in parallel, and with their common terminals facing opposite directions (e.g., a serial arrangement in which the negative terminal of one battery is electrically connected to the positive terminal of another battery). Furthermore, two compressible contact terminals 12 and two fixed contact terminals 13 are installed within the battery compartment 10 at opposite ends thereof, in the direction L, so as to make contact with respective terminals 9a and 9b of batteries 9. However, it is understood that the batteries 9 may be arranged such that the positive terminal of each battery is connected together, and the negative terminal of each battery is connected together (e.g., a parallel arrangement). Alternatively, plural batteries in an electronic device can be arranged in both a parallel configuration and a serial configuration. Thus, it should be appreciated that the actual battery arrangement of a plurality of batteries has no effect on the applicability of the present invention.

In other words, the compressible contact terminal 12 (which contacts negative terminal 9a of battery 9) and the fixed contact terminal 13 (which contacts the positive terminal 9b of battery 9) are installed on the same internal sidewall of the battery compartment 10, and their respective opposing contact terminals are installed on an opposite sidewall of the battery compartment 10 in the battery lengthwise direction L. As a result, the call device 200, as embodied by the invention, receives electrical power by means of each battery terminal 9a maintaining contact with each compressible contact terminal 12, and each opposing battery terminal 9b maintaining contact with each fixed contact terminal 13.

In the disclosed embodiment, the battery cover 11 is manufactured from ABS, or similar type, plastic material. However, the battery cover 11 may be manufactured from other materials without departing from the scope and/or spirit of the invention. As shown in FIGS. 1A, 3, 4A, and 4B, a battery fixing base plate 15, also referred to as base plate 15, is associated with the battery cover 11. The battery fixing base plate 15 comprises a plate-like structure that is movably attached to an internal surface of the battery cover 11, and is slidable in the direction L. In particular, a guide post (not shown in the drawings) extends into the battery compartment 10 and is formed at the approximate center of an inner surface of the battery cover 11, while a slot, also referred to as an aperture, 15a, that is oriented in the direction L, is formed in the approximate center of base plate 15. In the preferred embodiment, the base plate 15 is installed proximate the inner surface of battery cover 11 by inserting the aforesaid guide post into the slot 15a, and attaching button 16 to the guide post to retain the base plate 15 therein. In the disclosed embodiment, the aperture 15a is formed as an elongated slot that is larger in size than the diameter of the guide post, so that the battery cover 11 may move, relative to the base plate 15, in the direction L. However, it is understood that the actual dimension of the aperture 15a and guide slot is not critical to the operation of the present invention, and depends upon the environment, or situation, in which the present invention is employed. Accordingly, in the situation where, for example, the battery cover 11 is snapped onto the battery compartment 10 without a sliding motion in the direction L, discussed below, a relative movement between the battery cover 11 and base plate 15 may not be necessary, and thus, the dimension of the aperture 15a and guide post can be substantially equivalent.

While the present invention is described with respect to base plate 15 secured to the battery compartment 10 via the guide post and attaching button, it is understood that this attachment is not necessary for the execution of the invention. Thus, the present invention is equally applicable to the arrangement in which the base plate 15 is separate from the battery cover 11. This arrangement permits the base plate 15 to be retrofitted into legacy devices; e.g., electronic devices not manufactured in accordance with the present invention.

Friction finger 15b (see FIG. 4B) is formed between adjacent cutout portions at each extremity of the battery fixing base 15 in the direction L. A stop tab 11b, which extends outward from the inner surface of the battery cover 11, is formed at a specific distance from an indexing tab 15c (see FIG. 4A). The stop tab 11b and the indexing tab 15c are removably connected to the friction finger 15b. In other words, the friction finger 15b flexibly deforms in the direction L as a result of the application of a relatively strong external pressure, to release from a formerly joined condition to stop tab 11b or indexing tab 11c as a result of the deformation, and thereby restricts the movement of the battery fixing base plate 15.

Figure 3:
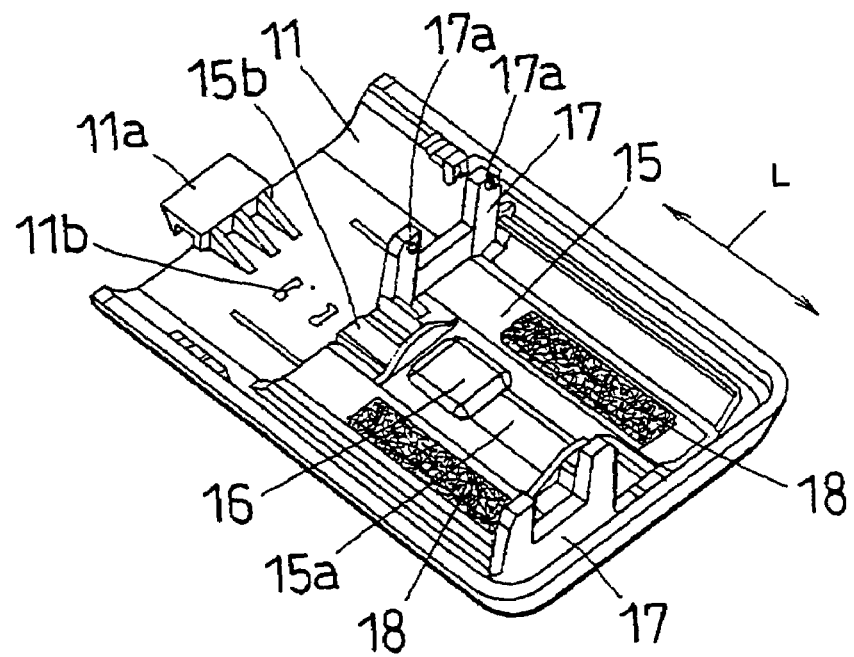
FIG. 3 illustrates in greater detail the construction of the battery cover used with the portable call device of FIG. 1A.

Two battery set flanges 17 (each hereafter referred to as "set flange 17"), each appearing as a plate-like structure when frontally viewed, extend outward from the inner surface of the base plate 15, and are located proximate opposite extremities of the base plate 15 in the direction L of the batteries 9 housed within the battery compartment 10. Thus, in the disclosed embodiment, the set flanges are symmetrically arranged on the base plate. Such an arrangement facilitates assembly of the base plate 15 to the battery cover 1, because an individual (or machine) assembling the battery cover/base plate combination does not have to pay particular attention to the orientation of the base plate with respect to the battery cover. However, it is noted that the arrangement of the set flanges is not critical. Thus, depending on the physical placement of plural batteries in the battery compartment, plural set flanges may be symmetrically or asymmetrically arranged. As shown in FIG. 3, each set flange 17 has a "U-shaped" configuration, or appearance, to easily fit into the compressible contact terminal 12. However, it is understood that the shape, or physical configuration, of each set flange may be varied without departing from the scope and/or spirit of the invention. When the battery cover 11 is installed proximate the battery compartment 10, each set flange 17, which extends outward into the battery compartment 10 at an approximate right angle from the inner surface of the base plate 15, enters a region between a battery compartment sidewall, to which the compressible contact terminal 12 is attached, and the negative battery terminal 9a of the battery, which is in contact with the compressible contact terminal 12.

When the battery cover 11 is installed with respect to the battery compartment 11, the set flanges 17 is positioned between a battery compartment internal sidewall to which the compressible contact terminal 12 is attached and the negative battery terminal 9a which is in contact with terminal 12. Each set flange 17 prevents the movement of its respective battery 9 in the direction L. The thickness of the set flange 17 corresponds to the width of a gap between the inner wall of the battery compartment 10 and the negative battery terminal 9a. Alternatively, as disclosed in the preferred embodiment, the thickness of the set flange 17 can be less than the width of the gap between the inner wall of the battery compartment 10 and the negative battery terminal 9a if a protrusion 17a is formed on a surface of the set flange 17 (see FIGS. 4A and 4B), such that the thickness of the set flange 17 and protrusion 17a corresponds to the aforesaid gap. Such an arrangement facilitates insertion of the set flange within the gap between the inner wall of the battery compartment 10 and the negative battery terminal 9a.

A cushioning pad 18 is provided for with each battery 9. In the disclosed embodiment, the cushioning pad 18 comprises a sponge-like material. However, alternative materials may be employed without departing from the scope and/or spirit of the invention. Each cushioning pad 18 is attached to the inner surface of base plate 15 using an adhesive or bonding material. Each cushioning pad 18 provides a resilient support surface for the side of the associated battery 9 installed within the battery compartment 10. The base plate 15 is structured so as to extend in a direction away from the inner surface of battery cover 11, while each set flange 17 and each cushioning pad 18 are located at positions where they will come into contact with their associated battery 9.

A discussion will hereinafter be provided with respect to the orientation of the base plate 15 and the battery cover 11, along with a discussion describing the procedure through which the battery cover 11 is attached to the battery compartment 10.

Figure 4A:
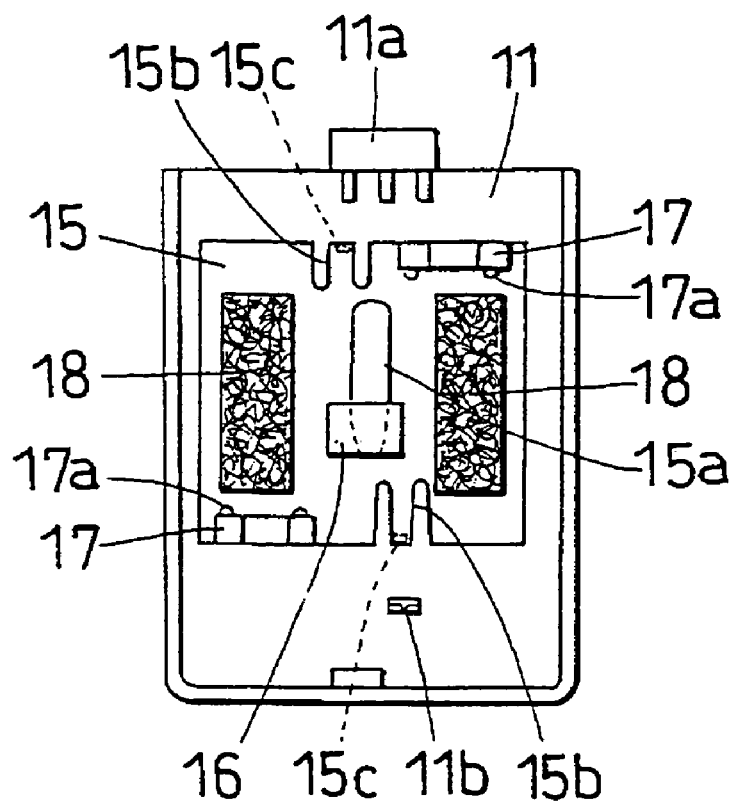
FIG. 4A illustrates an orientation of a base plate with the battery cover for attachment to the battery compartment of the portable call device of FIG. 1A.

Initially, slot 15*a* of the base plate 15 is placed over the aforesaid guide post that is formed on the inner surface of the battery cover 1, and button 16 is attached to the guide post, thus forming a sliding joint between the base plate 15 and the inner surface of the battery cover 11. The base plate 15 is then slid to a position nearest latch 11*a* of the battery cover 11, as shown in FIG. 4A. Next, as shown in FIG. 1A, the battery cover 11 is pressed against the rear surface of the case 1, so that each set flange 17 is brought into close proximity with its associated compressible contact terminal 12. At this point, the battery cover 11 comes into contact with the rear of the case 1, with part of the battery compartment 10 remaining exposed, as shown in FIG. 1B. Battery cover 11 is then slid in the direction L (see FIG. 1B) to bring the battery cover 11 to a fully closed position (see FIG. 1C).

Figure 4B:
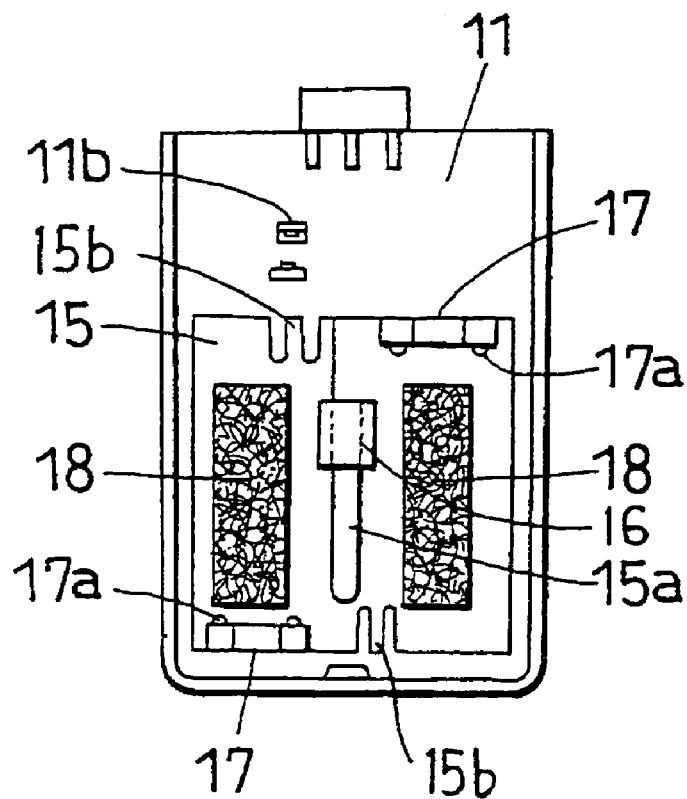
FIG. 4B illustrates the base plate in a closed position when the battery cover of the portable call device of FIG. 1A is slid to a closed position.
Figure 5A:
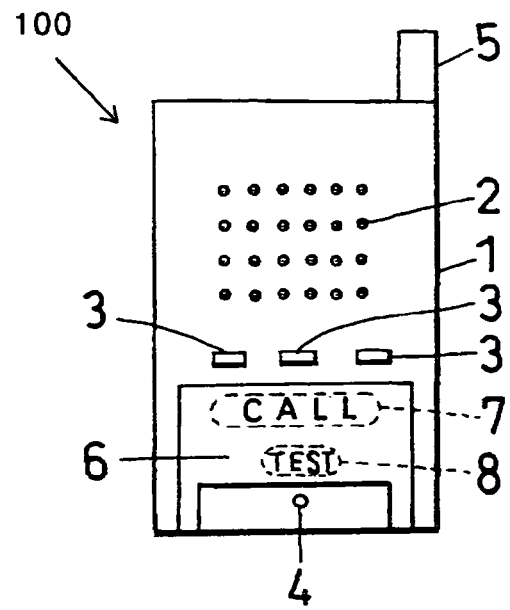
FIGS. 5A to 5C illustrates a conventional portable call device.
Figure 5B:
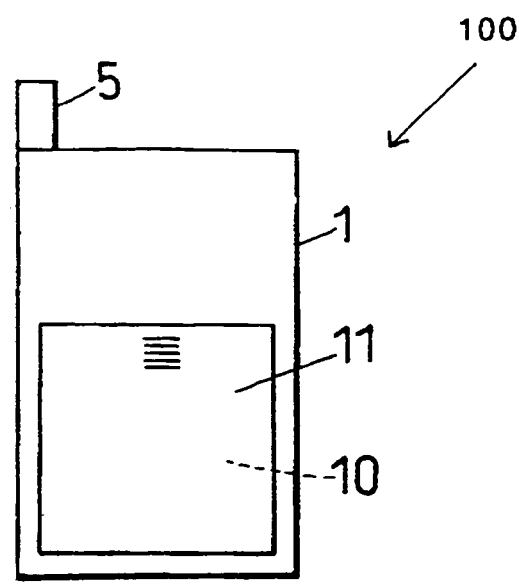
Figure 5C:
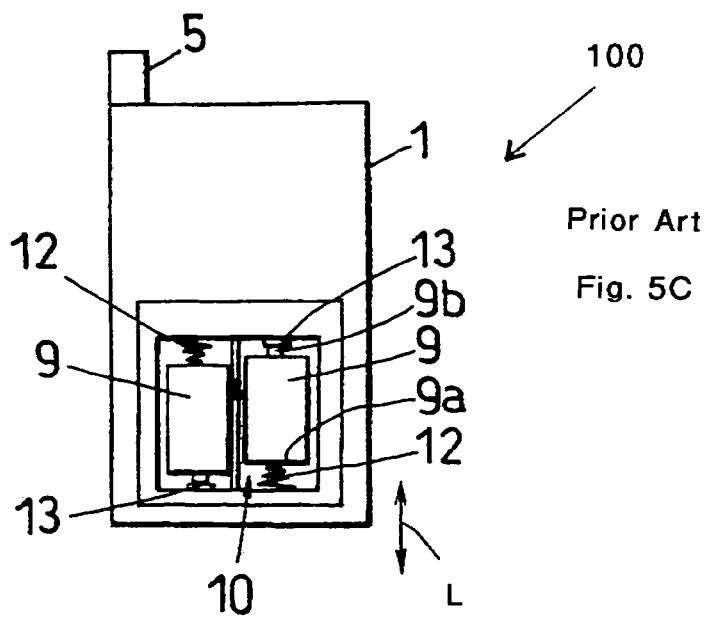

When the battery cover 11 is slid to the fully closed position, latch 11*a* on the battery cover 11 engages with the latch stop 1*a* in the rear surface of the case 1, thus completely securing the battery cover 11 to the battery compartment 10. With the battery cover 11 thus secured, the position of the base plate 15 and the position of each set flange 17 within the battery compartment 10, while not externally visible, is as illustrated in FIG. 4B.

It is noted that the base plate 15, the construction of which is described as having a set flange 17 that corresponds to an associated battery 9 installed within the battery compartment 10, is not limited to described structure, but is merely an example of a base plate employed with the preferred embodiment. It is understood that alternative base plate structures may be employed without departing from the scope and/or spirit of the present invention. In this regard, an alternative base plate construction will be described below.

In an alternative construction, the base plate 15 is formed as two separate base plates, each corresponding to one of the two batteries 9 that are held within the battery compartment 10. In the alternative base plate, the set flanges 17 are positioned to be located at a mutually opposing end on each of the two base plates. In other words, the two base plates 15 are arranged in parallel in the same orientation as the two batteries 9, with each set flange 17 formed on each base plate 15 being inserted between an inner sidewall of the compartment 10 to which the compressible contact terminal 12 is installed, and the negative battery terminal 9*a* of the associated battery 9 that contacts the compressible contact terminal 12.

As previously noted, while the preferred embodiment describes a call device 200 that receives electrical power from two batteries 9 installed within the battery compartment 10, the structure of the present invention is equally applicable to a call device that employs a single battery 9. In this case, the base plate 15, which is installed proximate the inner surface of the battery cover 11, is designed to include only one set flange 17. That is, only one set flange 17 is formed on the base plate 15 that is mounted to the inner surface of battery cover 11. Further, it is envisioned that in the situation where the call device employs more than two batteries, the base plate 15 is modified to include a number of set flanges equal to the number of batteries, with the set flanges being positioned relative to the location of each compressible contact terminal associated with each battery.

Because the set flange 17 enters the region between the internal sidewall of the battery compartment 10 to which the compressible contact terminal 12 is attached, and the negative battery terminal 9*a* of the battery that is in contact with the compressible contact terminal 12, thus removing any slack existing in the region, a movement of the battery 9 in the direction L within the battery compartment 10 is prevented. The set flange 17 reduces the possibility of the battery 9 losing contact with the compressible contact terminal 12 and the fixed contact terminal 13 when the call device is subjected to a shock or drop. As a result, the possibility of the call device losing electrical power, either momentarily or permanently, due to the call device being subjected to an impact is greatly reduced, or even eliminated. In this regard, it is noted that the base plate 15, even when constructed to include only one set flange 17, is still movably joined to the battery cover 11, so as to allow a sliding movement thereon in the direction L.

While the disclosed embodiment describes a compressible contact terminal 12 that is formed as a coil spring, it is understood that the compressible contact terminal 12 may be formed from any type of pliable or flexible material, such as, but not limited to, for example, a plate spring, and such alteration will not result in a departure from the scope and/or spirit of the invention.

Moreover, it is also understood that the structure of the fixed contact terminal 13 may differ from that disclosed in herein without departing from the scope and/or spirit of the invention. For example, the fixed contact terminal 13 may alternatively be formed from, but not limited to, for example, a plate spring or a wire spring.

Further, while the present invention has been described with respect to a set flange that engages a region associated with the negative terminal of a battery, it is understood that the present invention is equally applicable with respect to the positive terminal of the battery without departing from the scope and/or spirit of the invention. For example, in a variation of the invention, the set flange 17 is modified to be conductive and to engage a region between the fixed contact terminal 13 and the positive battery terminal 9*b* of the battery 9 that is in contact with the fixed contact terminal 13. The insertion of the set flange 17 in this region results in the creation of a tension in the compressible contact terminal 12*a*. Such tension resists further movement of the battery, and subsequent loss of electrical power to the call device, due to the lose of contact between the battery and the compressible and fixed contact terminals 12 and 13, when the call device is subjected to a shock. That is, an undesirable movement of the battery 9 in the direction L within the battery compartment 11 is prevented by the set flange.

As described above, a call device includes a battery fixing base plate that is attached to an inner surface of a battery cover, and a battery set flange is formed on the battery fixing base plate. The battery set flange inserts into a region between an internal sidewall of the battery compartment, to which a compressible contact terminal is attached, and a battery terminal in contact with the compressible contact terminal, in order to prevent a movement of the battery in a lengthwise direction. The battery movement prevention mechanism, provided by the battery set flange, ensures that electrical power supplied by the battery to the call device is continually supplied, even in the event that the call device is subjected to an externally applied shock, such as may occur when a user drops the call device.

The portable electronic device, such as a portable call device constructed in accordance with the present invention, can provide a sliding connection between the base plate and battery cover. The sliding connection offers the advantage of easy installation and removal of the base plate to and from the battery cover, and thus eliminates the chance of the user forgetting to attach the base plate, and further assures that the battery movement prevention function provided by the base plate will always be maintained.

The portable electronic device can be powered from a single battery or a plurality of batteries. When a call device is designed to use a plurality of batteries, the plurality of batteries are installed within the battery compartment such that the common battery terminals are disposed in oppositely facing directions. A plurality of battery fixing base plates equal to the number of the plurality of batteries are provided, with each battery fixing base plate being located mutually adjacent and in parallel to the other. Each battery fixing base plate includes a battery set flange formed thereon. Each battery set flange is inserted at a location mutually opposite to the other set flange, in a region between one of a contact terminal 12 or 13 and an associated battery terminal 9a or 9b that is in contact with the one contact terminal 12 or 13. As a result of this construction, commonly used call devices, of the type which contain plural batteries adjacently aligned in parallel, are able to easily incorporate the battery power interruption prevention mechanism described by the invention.

One base plate structure can accommodate a single battery or a plurality of batteries. The base plate is attached to the inner surface of the battery cover through a sliding joint that allows the base plate to slide in the longitudinal battery direction this construction makes for an easy installation and removal of the base plate to and from the inner surface of the battery cover, and enhances the practical application of the invention as a battery power interruption prevention mechanism.

Further, a cushioning part may be attached to the inner surface of the base plate. The cushioning part applies pressure to the side of the battery to hold the battery firmly in place within the battery compartment.

Still further, as noted above, the present invention is applicable to any electronic device that employs at least one battery and which may be subjected to being dropped or jarred.

The present disclosure relates to subject matter disclosed in Japanese priority document JP2002-215641, filed on Jul. 24, 2002, the contents of which are expressly incorporated herein by reference in its entirety.

We claim:

1. A battery operated electronic device having a case within which a battery compartment is provided, a battery cover removably sealing the battery compartment, and compressible and fixed contact terminals that connect to corresponding battery terminals located at opposing ends of a battery installed within the aforesaid battery compartment, wherein
a battery fixing base plate having a battery set flange formed thereon that is attached to an inner surface of the battery cover; said battery set flange entering a region between an internal sidewall of the battery compartment, to which the compressible contact terminal is attached, and the battery terminal in contact with the compressible contact terminal, when the battery cover is attached to the case, said battery set flange preventing movement of the battery in a longitudinal direction.

2. The battery operated electronic device of claim 1, wherein said battery fixing base plate is joined to the battery cover through a sliding joint.

3. The battery operated electronic device of claim 1, wherein:
two batteries are installed in the battery compartment, a common terminal of each battery being oriented in oppositely facing directions; and
two battery fixing base plates are provided, each battery fixing base plate being located mutually adjacent and in parallel to an other on the inner surface of the battery cover, each battery fixing base plate having a battery set flange formed thereon, each battery set flange being inserted, at a location mutually opposite to the other set flange, in the region between the internal sidewall of the battery compartment to which the compressible contact terminal is attached, and the battery terminal in contact with the compressible contact terminal.

4. The battery operated electronic device of claim 3, wherein one battery fixing base plate is used with two batteries, a sliding joint that slides in a longitudinal direction being formed with said battery cover.

5. The battery operated electronic device of claim 1, wherein a cushioning part is attached to the inner surface of the aforesaid battery fixing base plate, said cushioning part maintaining contact with a side of the battery installed in the battery compartment.

6. The apparatus of claim 1, wherein the battery fixing base plate comprises a plurality of battery fixing base plates, a number of battery fixing base plates corresponding to a number of batteries installed in the battery compartment, each battery fixing base plate of said plurality of battery fixing base plates including an associated set flange.

7. A method for preventing a loss of electrical power in a battery operated electronic device when the battery operated electronic device is subjected to an impact, the battery operated electronic device having a case within which a battery compartment is provided to receive at least one battery, a compressible contact terminal and a fixed contact terminal being located within the battery compartment to engage corresponding battery terminals of the at least one battery, and a battery cover that selectively seals the battery compartment, the method comprising:
inserting a set flange into a region between an internal sidewall of the battery compartment, to which the compressible contact terminal and is attached, and a negative battery terminal of the battery in contact with the compressible contact; and
maintaining the set flange in the region as the battery cover seals the battery compartment.

8. The method of claim 7, further comprising:
providing a guide post on an inner surface of the battery cover that extends into the battery compartment when the battery cover seals the battery compartment;
providing a battery fixing base plate that includes a slot formed at an approximate center of the battery fixing base plate;
placing the battery fixing base plate proximate an inner surface of the battery cover by passing the guide post provided on the battery cover through the slot in the battery fixing base plate; and
attaching a securing button to the guide post to prevent a separation of the battery fixing base plate from the battery cover.

9. The method of claim 8, further comprising:
providing two batteries that are received in the battery compartment with their common terminals facing opposite directions, a negative terminal of a first battery making electrical contact with a positive terminal of a second battery; and
providing two set flanges, each set flange extending outward from the battery fixing base plate to be inserted in a respective region associated with each battery, the two set flanges being symmetrically arranged on the battery fixing base plate.

* * * * *